United States Patent [19]

Nakamata

[11] Patent Number: 4,524,503
[45] Date of Patent: Jun. 25, 1985

[54] METHOD AND APPARATUS FOR HYDRAULICALLY ASSEMBLING A DRIVEN SHAFT AND A DRIVE MEMBER

[75] Inventor: Hideo Nakamata, Toyota, Japan

[73] Assignee: Toyota Jidosha Kabushiki Kaisha, Toyota, Japan

[21] Appl. No.: 459,597

[22] Filed: Jan. 20, 1983

[30] Foreign Application Priority Data

Jan. 20, 1982 [JP] Japan .................................. 57-7205

[51] Int. Cl.³ .............................................. B23Q 17/00
[52] U.S. Cl. ...................................................... 29/407
[58] Field of Search ........................... 29/407, 707, 709

[56] References Cited

U.S. PATENT DOCUMENTS

| | | | |
|---|---|---|---|
| 3,570,101 | 3/1971 | Stead | 29/709 |
| 3,867,752 | 2/1975 | Tachibana et al. | 29/707 |
| 4,104,790 | 8/1978 | Hindrichs | 29/707 |
| 4,163,310 | 8/1979 | Sigmund | 29/407 |
| 4,333,220 | 6/1982 | Aspers | 29/407 |

Primary Examiner—Howard N. Goldberg
Assistant Examiner—Steven Nichols
Attorney, Agent, or Firm—Kenyon & Kenyon

[57] ABSTRACT

A driven shaft is assembled into a driving member using a hydraulic actuator while measuring the supply pressure to the actuator during the press-in operation of the driven shaft into the driving member and while monitoring the stroke of the hydraulic actuator. The apparatus provides a first indication if a pressure rise occurs after the actuator stroke has reached a predetermined assembly position and a second indication if a pressure rise occurs before the actuator stroke has reached the predetermined position, thereby displaying whether or not the driven shaft is correctly fitted to the driving member.

8 Claims, 9 Drawing Figures (a)

(b)

(c)

METHOD AND APPARATUS FOR HYDRAULICALLY ASSEMBLING A DRIVEN SHAFT AND A DRIVE MEMBER

BACKGROUND OF THE INVENTION

This invention relates to a method and apparatus for hydraulically assembling a driven shaft to a driving member, and particularly to such a method and apparatus for detecting improper or incomplete assembly.

It is a conventional procedure to assemble or couple a driven shaft, such as a front axle of a frontwheel drive automotive vehicle, with a snap ring in a circumferential groove adjacent to one end, to a driving member by means of a hydraulic device. The end of the drive shaft is pressed by the hydraulic device into a mating socket portion of the driving member until the snap ring engages a groove provided at a specified axial location in the mating portion of the driving member, so that the ring will prevent the driven shaft from slipping out from the driving member.

In this procedure, occasionally the snap ring will be caught by an inlet portion of the driving member and will prevent the driven shaft from being inserted far enough into the driving member for the snap ring to engage the specified groove.

In a normal assembling operation, the driven shaft is moved to the predetermined assembled position by supplying a sufficient amount of oil to a cylinder of a hydraulic actuator at a sufficient pressure to slide the end of the shaft into the driving member. An overload may be imposed on the hydraulic actuator if the snap ring becomes caught by the inlet end of the driving member, or the hydraulic cylinder may otherwise be rendered inoperative due to some load variations.

Conventionally, correct assembly of the driven shaft into the driving member is determined by ascertaining that the stroke of the hydraulic actuator reaches a predetermined point. Some installations use a limit switch for measuring the stroke, or a stroke measuring unit such as a linear scale, for example. These additional devices are disadvantageous in that they require installation space, and the linear scale is expensive. Another disadvantage is that malfunctioning of the hydraulic actuator due to load variations is detected only indirectly, by way of measurement of the stroke of the actuator.

Where a shaft is pressed in against a stopper by means of a hydraulic actuator, an indication of abutting engagement between the shaft and the stopper is normally gained indirectly by measuring the stroke of the hydraulic actuator. It has been difficult to provide a direct indication which shows that the shaft has abutted against the stopper.

SUMMARY OF THE INVENTION

Accordingly, an object of the present invention is to provide a method of assembling a driving shaft to a driving member, which method is free from the drawbacks of the conventional method.

More specifically, the object of the present invention is to provide a method of assembling a driven shaft into a driving member, while monitoring the load under which the rotary shaft is pushed into the driving member in addition to sensing the stroke of a hydraulic actuator which is adapted to push the driven shaft into the driving member.

Another object of the present invention is to provide a method of assembling a driven shaft having a snap ring fitted adjacent to an end of the shaft into a driving member, which method prevents damage if the snap ring becomes caught as the shaft enters the driving member.

A further object of the present invention is to provide a method of assembling an end of a driven shaft having a snap ring fitted adjacent to said end into a driving member, which method determines the status of insertion of the driven shaft into the driving member.

A still further object of the present invention is to provide an apparatus for carrying out such a method.

According to the present invention, supply pressure to a hydraulic actuator which is adapted to push or press an end of a driven shaft, having a snap ring fitted adjacent to said end, into a driving member is measured during the assembling operation, while the stroke of the hydraulic actuator is concurrently detected. Based on the measured supply pressure to the hydraulic actuator and the detected stroke position, the assembly status of the driven shaft with the driving member is determined.

The above and other objects and features of the present invention will be apparent from the following description of the invention in conjunction with the attached drawings, it being understood that modifications and/or variations may be within the scope of the appended claims without departing from the spirit of the invention.

DETAILED DESCRIPTION OF THE INVENTION

The present invention is based on the principle that when the dynamic pressure of a moving liquid changes, then the static pressure changes accordingly. Therefore, if the static supply pressure of a hydraulic actuator for assembling a rotary shaft into a rotary member is measured, abnormality in assembly can be detected.

In the following description a front-drive system for an automobile is illustrated to explain the present invention, but it is only an illustrative example and is not intended to limit the scope of the present invention.

Figure 1:
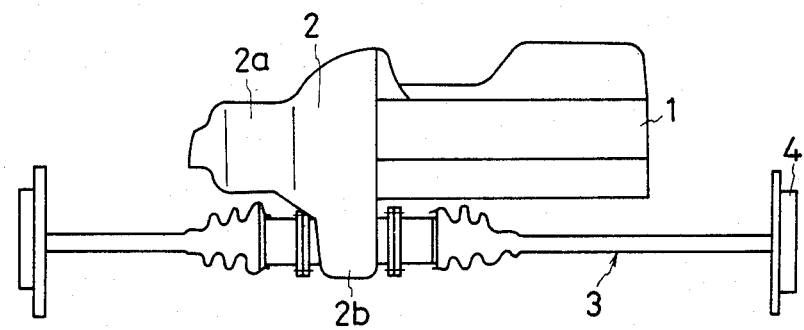
FIG. 1 is a schematic front elevation view of the drive system of a front-drive automobile.
Figure 2:
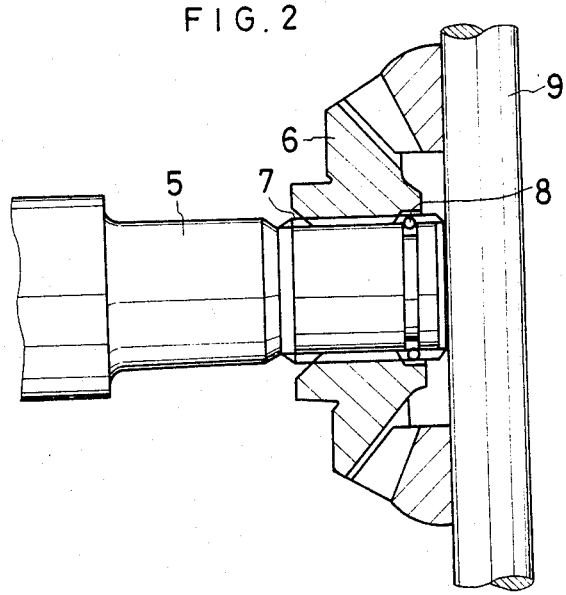
FIG. 2 is a side view, partly in cross section, of a splined driven shaft assembled into a differential gear.
Figure 3:
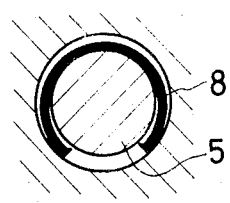
FIG. 3 is a cross-sectional view in the direction of arrows 3—3 in FIG. 2 of a snap ring mounted in the differential gear of FIG. 2.

As shown in FIGS. 1, 2 and 3, the drive system of a front-drive automobile transmits driving power from an engine 1 to front wheels 4 through a trans-axle 2 having a transmission 2a and a differential gear 2b combined with each other, the differential gear being coupled to a pair of axles 5 (driven shafts). Each driven shaft 5 and a differential side gear 6 (driving member) are coupled together through splines or serrations 7, with a snap ring 8 for preventing the driven shaft from slipping out from the driving member.

The method of assembling a shaft into a rotatable driving member according to the present invention is characterized by the steps of fitting a shaft withdrawal-prevention snap ring in a circumferential groove adjacent to an end of the shaft to be inserted into the rotatable member, abutting said end of the shaft having the snap ring against a mating portion of the rotatable member in alignment therewith for insertion of the shaft into the rotatable part, pressing said shaft by means of a hydraulic actuator into the mating portion of the rotatable member until the snap ring engages a snap ring-attachment groove in said rotatable member, measuring supply pressure to the hydraulic actuator during insertion of the shaft and detecting the difference between stroke positions of the hydraulic actuator before and after the shaft is inserted simultaneously with the pressure measurement, whereby the assembly condition of the shaft can be determined by comparing measured stroke with measured supply pressure of the hydraulic actuator during the shaft assembling operation.

Figure 4:
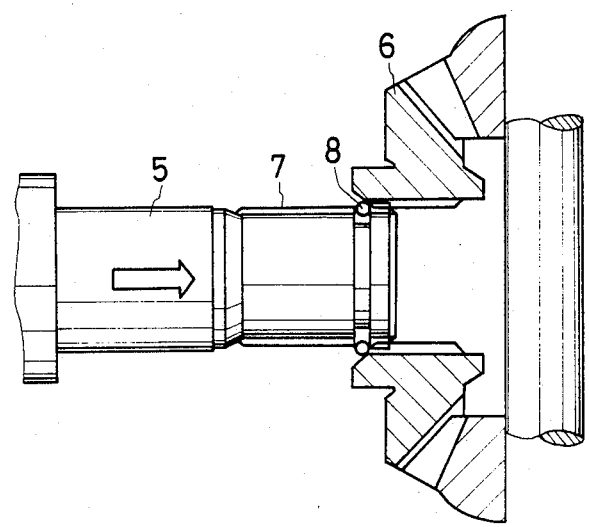
FIG. 4 is a side view partly in cross section view of the driven shaft of FIG. 2 with its splines aligned with gaps between splines in the differential gear before the driven shaft is inserted.
Figure 5:
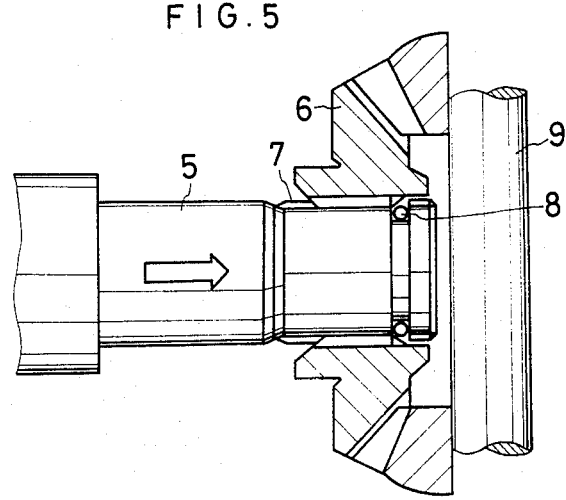
FIG. 5 is a side view of the driven shaft of FIG. 2 showing the driven shaft almost fully inserted.

FIGS. 4 and 5 show the steps of assembling a driven shaft into a differential gear. In FIG. 4, the driven shaft 5 and the differential gear 6 are positioned with their splines aligned with each other. In FIG. 5, the driven shaft 5 has been pushed in and a snap ring is just about to expand into an internal circumferential groove provided at a predetermined axial location in the differential gear.

If the snap ring 8 is caught immediately in front of the splined portion of the differential gear 6, the supply pressure to a hydraulic actuator pushing the shaft increases abruptly, and the hydraulic actuator is stopped. On the contrary, when the snap ring 8 enters smoothly without getting caught at an inlet end of the splined portion of the differential gear 6, the driven shaft 5 is inserted until it abuts against a center pin 9. The hydraulic actuator stops when the driven shaft 5 engages the center pin 9, and the hydraulic supply pressure rises quickly.

Figure 6:
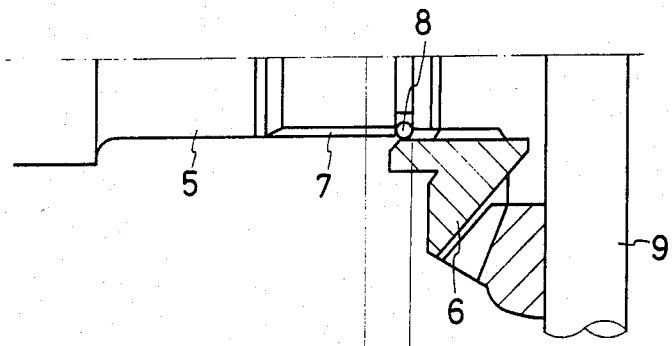
FIGS. 6a-6c is a set of side views in partial cross section showing a split ring on the driven shaft caught at the entrance to the driving member (a) and the driven shaft coupled normally with the driving member (b) and a diagram (c) showing the relation between these two situations and corresponding hydraulic pressure variations measured during assembly.
Figure 6:
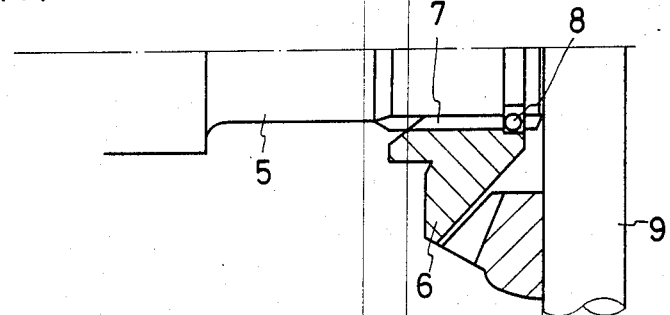
Figure 6:
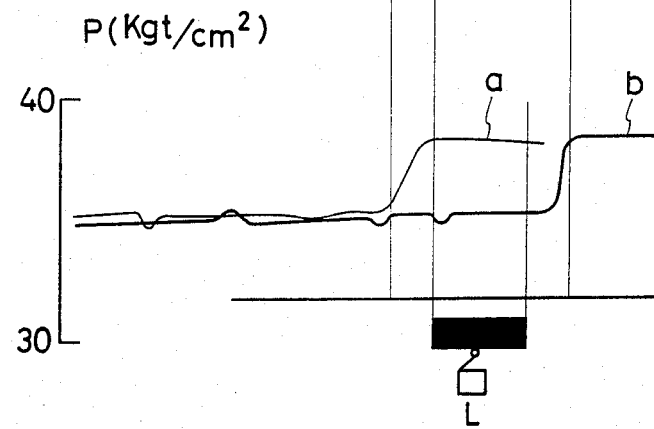

The difference in stroke between the location at which the snap ring comes to the inlet of the differential gear and the location at which the snap ring drops into the groove in the gear is detected by a suitable position detector L (such as a limit switch) as schematically illustrated in FIG. 6c. The position detector is conventional, so explanation of its operation is omitted. When the pressure P increases while the position detector L is de-energized, the snap ring 8 is detected as being caught in the position as shown in FIG. 6a. When the pressure P increases after the position detector L has been turned on, the driven shaft 5 is determined as abutting against the differential center pin 9 in the position as shown in FIG. 6b, in which the snap ring 8 has reached the predetermined locking position.

Figure 7:
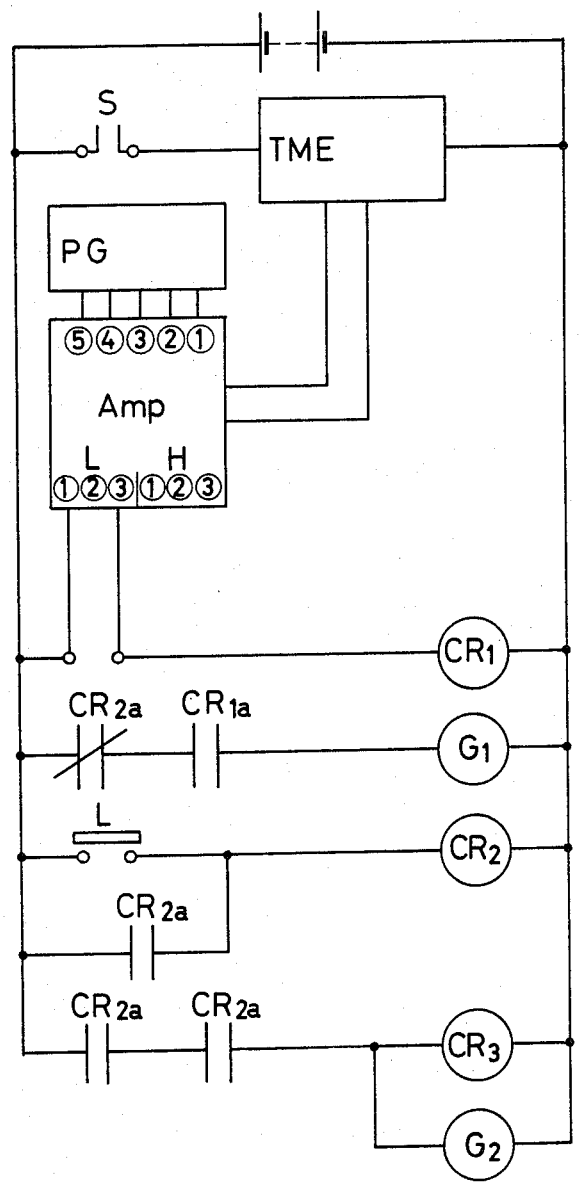
FIG. 7 is a schematic diagram illustrating an electric circuit for detecting the state of assembly of the driven shaft into the driving member.

FIG. 7 illustrates an electric circuit for detecting the state of insertion of the driven shaft 5 and supply pressure variations. The electric circuit is capable of measuring the conditions of the hydraulic actuator from the time when it is started to the time when it is stopped. For example, after a start signal S has been supplied, an A/D converter TME is energized to provide input power to a pressure detector PG. If the pressure measured by the pressure detector PG increases while the limit switch L is turned off, an output signal from the pressure detector PG is amplified by an amplifier Amp to pass a current through a relay $CR_1$, thereby closing normally open contacts $CR_{1a}$, whereupon a lamp $G_1$ is turned on. This lamp indicates that the shaft is in the abnormal position shown in FIG. 6a.

When the driven shaft 5 is normally inserted until it engages the center pin 9, the pressure as measured by the pressure detector PG increases only after the limit switch L has been turned on, thus actuating a second relay $CR_2$ to open normally closed contacts $CR_{2a}$ and to shut normally open contacts $CR_{2b}$. When the pressure increases, the output signal from the pressure detector PG is amplified by the amplifier Amp to pass a current through the relay $CR_1$, thereby closing the normally open contacts $CR_{1a}$ and $CR_{1b}$. Since contacts $CR_{2a}$ are open, lamp $G_1$ remains unlit. Since contacts $CR_{2b}$ are shut, a lamp $G_2$ is turned on to indicate that the driven shaft 5 has been fully inserted into locking position.

With the method of the present invention, as described above, the pressure supplied to a hydraulic actuator for inserting a shaft into a rotatable part is measured, and at the same time the position of the shaft as it is inserted is detected for determining the insertion condition of the shaft based on the relationship between pressure variation and detected position. The method is easily applicable to many different operations, and hence can be incorporated into procedures for mass-producing products for increased efficiency. The method of the invention does not require a large-size apparatus and hence does not require special space for installation of apparatus for carrying out the method. Accordingly, there is no need to change conventionally employed apparatus for effecting the method.

We claim:

1. A method for inserting an end of a driven shaft having a snap ring disposed in a circumferential groove adjacent to said end into a mating opening in a driving member, the method including aligning the end of the driven shaft with the inlet to the opening of the driving member, pressing the end of the driven shaft into the opening of the driving member by means of a hydraulic actuator until the snap ring engages a groove provided inside the opening of the driving member, and detecting a stroke position of the actuator corresponding to the fully inserted state of the driven shaft, wherein the improvement comprises: measuring the supply pressure to the hydraulic actuator during the press-in operation;
   providing a first indication if the supply pressure rises when the fully inserted state of the driven shaft is detected; and
   providing a second indication if the supply pressure rises when the fully inserted state of the driven shaft is not detected, whereby information as to the supply pressure of the hydraulic actuator is combined with the information as to the stroke of the hydraulic actuator to determine whether or not the driven shaft is normally fitted into the driving member.

2. The method according to claim 1, wherein the driven shaft is a rotary shaft and the driving member is a differential side gear.

3. The method according to claim 1 or 2, wherein the stroke of the hydraulic actuator is detected by means of a limit switch.

4. The method according to claim 1 or 2, wherein the respective states of insertion of the driven shaft into the driving member are indicated by means of first and second lamps.

5. Apparatus for determining proper assembly of a driven shaft into a driving member, the driven shaft being inserted into the driving member by an actuator, the apparatus including means for detecting a stroke position of the hydraulic actuator corresponding to the fully assembled state of the driven shaft into the driving member, wherein the improvement comprises;

means adapted to measure supply pressure to a hydraulic actuator during a press-in operation of a driven shaft into a drive member, and means for discriminating whether or not the detecting means is detecting said stroke position when an increase of the hydraulic supply takes place.

6. The apparatus according to claim 5, wherein the stroke detecting means is a limit switch.

7. The apparatus according to claim 5 or 6, wherein the discriminating means comprises a relay actuated by the detecting means and an alarm means actuated by a pressure rise measured by the measuring means.

8. The system according to claim 7, wherein the alarm means is a lamp.

* * * * *